United States Patent
Yoshitake et al.

(10) Patent No.: US 9,994,693 B2
(45) Date of Patent: Jun. 12, 2018

(54) THERMALLY EXPANDABLE RESIN COMPOSITION

(71) Applicant: SEKISUI CHEMICAL CO., LTD., Osaka-shi, Osaka (JP)

(72) Inventors: Toshitaka Yoshitake, Hasuda (JP); Masaki Tono, Tokyo (JP); Kenji Otsuka, Hasuda (JP); Hideaki Yano, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 76 days.

(21) Appl. No.: 14/434,796

(22) PCT Filed: Oct. 10, 2013

(86) PCT No.: PCT/JP2013/006066
§ 371 (c)(1),
(2) Date: Apr. 10, 2015

(87) PCT Pub. No.: WO2014/057686
PCT Pub. Date: Apr. 17, 2014

(65) Prior Publication Data
US 2015/0284525 A1    Oct. 8, 2015

(30) Foreign Application Priority Data

Oct. 11, 2012 (JP) ................. 2012-226460

(51) Int. Cl.
| | | |
|---|---|---|
| C08J 9/00 | (2006.01) | |
| C08G 59/22 | (2006.01) | |
| C08K 5/3492 | (2006.01) | |
| C08K 3/04 | (2006.01) | |
| C08K 3/26 | (2006.01) | |
| C08K 3/32 | (2006.01) | |
| C08G 59/30 | (2006.01) | |
| C08G 59/50 | (2006.01) | |
| C08K 3/22 | (2006.01) | |

(52) U.S. Cl.
CPC ........ *C08K 5/34928* (2013.01); *C08G 59/226* (2013.01); *C08G 59/308* (2013.01); *C08G 59/504* (2013.01); *C08J 9/0066* (2013.01); *C08K 3/04* (2013.01); *C08K 3/22* (2013.01); *C08K 3/26* (2013.01); *C08K 3/32* (2013.01); *C08J 2363/02* (2013.01); *C08K 2003/2241* (2013.01); *C08K 2003/265* (2013.01); *C08K 2003/323* (2013.01); *C08L 2205/02* (2013.01); *C08L 2205/03* (2013.01)

(58) Field of Classification Search
CPC .. C08G 59/226; C08G 59/308; C08G 59/504; C08J 9/0066; C08J 2363/02; C08K 3/04; C08K 3/22; C08K 3/26; C08K 3/32; C08K 5/34928; C08K 2003/2241; C08K 2003/265; C08K 2003/323; C08L 2205/02; C08L 2205/03
See application file for complete search history.

(56) References Cited

U.S. PATENT DOCUMENTS

| | | | |
|---|---|---|---|
| 4,100,118 A | 7/1978 | Numata et al. | |
| 4,177,174 A | 12/1979 | Hayashi et al. | |
| 4,192,786 A | 3/1980 | Shibayama et al. | |
| 4,959,438 A | 9/1990 | Tada et al. | |
| 5,426,169 A | 6/1995 | Starner | |
| 5,674,611 A * | 10/1997 | Saida | C08G 59/226 |
| | | | 428/344 |
| 6,472,070 B1 | 10/2002 | Muraoka et al. | |
| 6,514,612 B1 | 2/2003 | Moireau et al. | |
| 2007/0196612 A1 | 8/2007 | Igarashi | |
| 2008/0166484 A1* | 7/2008 | Smith | C08K 5/523 |
| | | | 427/385.5 |
| 2011/0091703 A1 | 4/2011 | Okamoto et al. | |
| 2015/0291773 A1 | 10/2015 | Yoshitake et al. | |

FOREIGN PATENT DOCUMENTS

| | | |
|---|---|---|
| EP | 0814121 A1 | 12/1997 |
| GB | 2417030 A | 2/2006 |
| JP | 11-116776 A | 4/1999 |
| JP | 2000-104366 A | 4/2000 |
| JP | 2000-143941 A | 5/2000 |
| JP | 2000-239492 A | 9/2000 |
| JP | 2002-012678 A | 1/2002 |
| JP | 2003-064209 A | 3/2003 |
| JP | 2003-147052 A | 5/2003 |
| JP | 2004-103495 A | 4/2004 |
| JP | 2006-213786 A | 8/2006 |
| JP | 2006-348229 A | 12/2006 |
| JP | 2007-146169 A | 6/2007 |
| JP | 2011-042715 A | 3/2011 |
| JP | 2011-074214 A | 4/2011 |
| TW | 200619296 A | 6/2006 |

OTHER PUBLICATIONS

STIC search, 2017.*
Communication dated Jun. 21, 2016 from the European Patent Office in counterpart application No. 13845646.2.
Communication dated Jun. 21, 2016 from the European Patent Office in related application No. 13845981.3.
Communication dated Nov. 28, 2016, from the Intellectual Property Office of Taiwan in counterpart application No. 102136679.
Office Action dated Feb. 14, 2017, which issued in prosecution of U.S. Appl. No. 14/434,201.
International Search Report of PCT/JP2013/06066 dated Dec. 24, 2013.

(Continued)

*Primary Examiner* — Irina S Zemel
(74) *Attorney, Agent, or Firm* — Sughrue Mion, PLLC

(57) ABSTRACT

A thermally expandable resin composition containing an epoxy resin, a thermally expandable graphite, and an inorganic filler excluding graphite. The epoxy compound contained in said epoxy resin contains a brominated epoxy compound, and contains, in addition to the brominated epoxy compound, a bisphenol-type epoxy compound and/or an aliphatic epoxy compound, wherein the weight ratio of the brominated epoxy compound to the bisphenol-type epoxy compound and/or aliphatic epoxy compound is in the range 99:1-1:99.

10 Claims, No Drawings

(56) References Cited

OTHER PUBLICATIONS

Chinese Search Report dated May 5, 2016, issued by the State Intellectual Property Office of the P.R.C. in related Chinese Application No. 2013800533955.
Communication dated May 13, 2016, issued by the State Intellectual Property Office of the P.R.C. in related Chinese Application No. 2013800533955.
Translation of JP 2006-348229 A, published Dec. 28, 2006.
International Search Report dated Dec. 24, 2013, issued by the International Searching Authority in related International Application No. PCT/JP2013/006071.
Communication dated Apr. 20, 2017, from the Intellectual Property Office of Taiwan in counterpart application No. 102136679.
Communication dated Sep. 8, 2017 from the United States Patent and Trademark Office in counterpart U.S. Appl. No. 14/434,201.
Nagase Chemtex, "Denacol Product and Technical Information", URL: https://www.nagasechemtex.co.jp/en/products/function_chemistry/pd_denacol.html (retrieved Sep. 5, 2017), pp. 1-3.

* cited by examiner

THERMALLY EXPANDABLE RESIN COMPOSITION

CROSS REFERENCE TO RELATED APPLICATIONS

This application is a National Stage of International Application No. PCT/JP2013/006066 filed Oct. 10, 2013, claiming priority based on Japanese Patent Application No. 2012-226460 filed Oct. 11, 2012, the contents of all of which are incorporated herein by reference in their entirety.

TECHNICAL FIELD

The present invention relates to an thermally expandable resin composition, more specifically, to an thermally expandable resin composition for the use of refractory coating materials for pillars, beams and walls, etc., the use of fireproof sashes, the use of fireproof compartment passage structures and the use of fireproof doors, etc.

BACKGROUND ART

Materials for a structure such as a building and a ship, etc. are required to have fire resistance which doesn't easily catch fire, etc. As an thermally expandable resin composition to be used for the use which is required to have fire resistance, it has been proposed an thermally expandable resin composition which forms an expansion residue and prevents spread of a flame, smoke, etc., of a fire, etc., when it is exposed to heat of a fire, etc.

More specifically, as the first thermally expandable resin composition, it has been proposed a thermally expandable resin composition, which does not contain a halogenated compound and has adhesive properties and contain:
(a) an epoxy functional monomer, an oligomer or an polymer
(b) a particulate phosphorus-containing compound
(c) a thermally expandable graphite
(Patent Document 1, claim 1 to claim 6).

By using this first thermally expandable resin composition, when it is rapidly exposed to flame, it is possible to keep a function as an adhesive agent.

Also, as the second thermally expandable resin composition, it has been proposed a thermally expandable flame resistant resin composition, which consists of 100 parts by weight of an epoxy resin, 10 to 300 parts by weight of a thermally expandable graphite subjected to neutralization treatment and 50 to 500 parts by weight of an inorganic filler (Patent Document 2).

By using this second thermally expandable resin composition, it is excellent in fire resistance because at the time of heating, an expansion residue is formed, it is possible to retain the shape of said expansion residue.

However, molded bodies obtained from these epoxy resin-containing thermally expandable resin composition become hard and fragile.

Therefore, if impact is provided, molded bodies of these epoxy resin-containing thermally expandable are relatively easily broken or cracked in some cases.

The problem that molded bodies of these epoxy resin-containing thermally expandable are relatively easily broken or cracked in some cases increases when used in the environment of low temperature such as a cold district, etc.

PRIOR ART DOCUMENTS

Patent Documents

Patent Document 1: JP 2008-506803A
Patent Document 2: JP 2000-143941A

SUMMARY OF THE INVENTION

Problem to be Solved by the Invention

Also, when the present inventors have studied, they have found that because molded bodies of epoxy resin-containing thermally expandable resin composition explained above are relatively high in elastic modulus the degree of deterioration of a metal blade used when cutting said molded bodies is increased.

An object of the present invention is to provide a thermally expandable resin composition which is excellent in fire resistance and stress at break and provides molded bodies having relatively low elastic modulus.

Means for Solving Problem

The present inventors have earnestly investigated, and as a result, they have found out that a thermally expandable resin composition which contains an epoxy resin wherein an epoxy compound contains at least one of a bisphenol-type epoxy compound, an aliphatic epoxy compound in addition to a brominated epoxy compound, a thermally expandable graphite and an inorganic filler, meets the objective of the present invention, and the present inventors accomplished the present invention.

That is, the present invention is to provide
[1] a thermally expandable resin composition which contains an epoxy resin, a thermally expandable graphite and an inorganic filler. An epoxy compound contained in said epoxy resin contains a brominated epoxy compound represented by Formula (21)

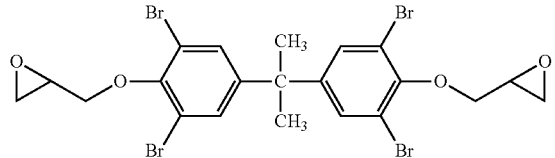

in addition to said Formula (21), at least one of a bisphenol-type epoxy compound represented by
Formula (1)

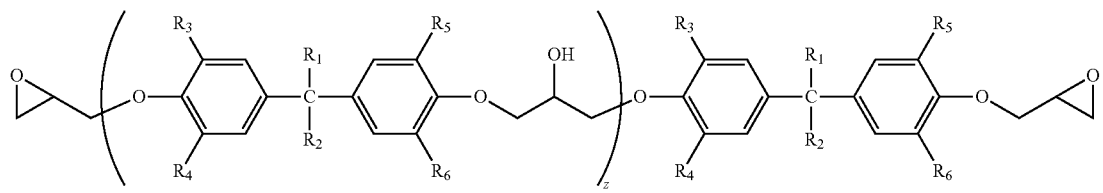

($R_1$ and $R_2$ are each independently a hydrogen atom or a methyl group, $R_3$-$R_6$ are each independently any one of a hydrogen atom or a methyl group. Z is a repeating unit ranging from 1 to 100.) and an aliphatic epoxy compound represented by
Formula (2)

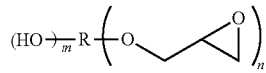

(R is an alkylene group having 1 to 500 carbon atoms, and can contain an oxygen atom. n is a repeating unit ranging from 2 to 4, m is a repeating unit ranging from 0 to 1 and n+m is the range of 2-4.),
and the ratio of a brominated epoxy compound to at least one of a bisphenol-type epoxy compound and an aliphatic epoxy compound ranges from 99:1 to 1:99 in weight.

Also, one of the present inventions is to provide
[2] the thermally expandable resin composition described in the [1], in which said aliphatic epoxy compound is a bifunctional aliphatic epoxy compound represented by
Formula (3)

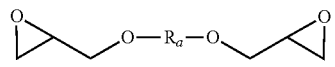

($R_a$ is a hydrocarbon radical having 1 to 500 carbon atoms, and can contain an oxygen atom).
[3] the thermally expandable resin composition described in the [2], in which said aliphatic epoxy compound is at least one selected from the group consisting of
Formula (3-1)

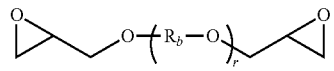

($R_b$ is an alkylene group having 2 to 4 carbon atoms. r is a repeating unit ranging from 1 to 500.) and
Formula (3-2)

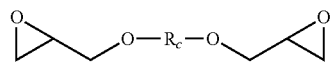

($R_c$ is an alkylene group having 2 to 10 carbon atoms).
Also, one of the present inventions is to provide
[4] the thermally expandable resin composition described in the [3], in which said aliphatic epoxy compound is at least one selected from the group consisting of the Formula (4)-Formula (9).

Formula (4)

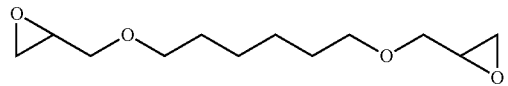

Formula (5)

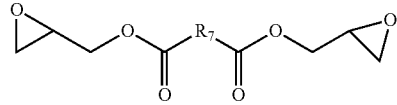

($R_7$ is any one of an alkylene group having 1 to 20 carbon atoms, alkenylene group having 1 to 20 carbon atoms or arylene group having 1 to 20 carbon atoms.)

Formula (6)

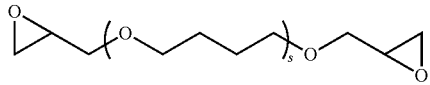

(s is a repeating unit ranging from 1 to 500.)

Formula (7)

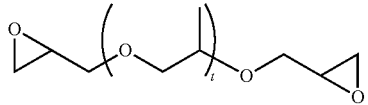

(t is a repeating unit ranging from 1 to 500.)

Formula (8)

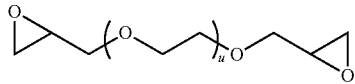

(u is a repeating unit ranging from 1 to 500.)

Formula (9)

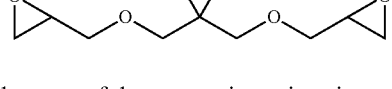

Also, one of the present inventions is to provide
[5] the thermally expandable resin composition described in the [1], in which said aliphatic epoxy compound contains Formula (2a)

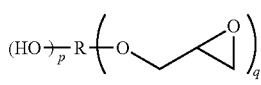

(R is an alkylene group having 1 to 500 carbon atoms, and can contain an oxygen atom. q is a repeating unit ranging from 3 to 4, p is a repeating unit ranging from 0 to 1 and p+q is the range of 3-4).

Also, one of the present inventions is to provide
[6] the thermally expandable resin composition described in the [5], in which said aliphatic epoxy compound is at least one selected from the group consisting of the Formula (10)-Formula (12).

Formula (10)

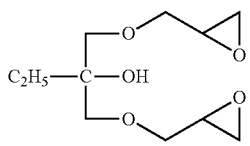

-continued

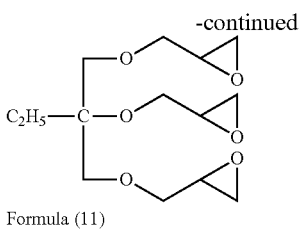

Formula (11)

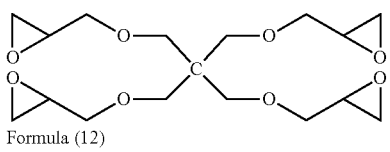

Formula (12)

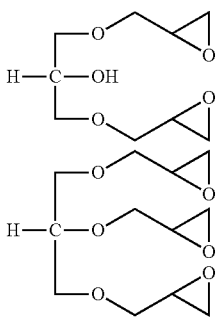

Also, one of the present inventions is to provide
[7] the thermally expandable resin composition described in any one of the [1] to [6], in which said epoxy resin contains an amino compound-containing epoxy curing agent, and said amino compound-containing epoxy curing agent contains at least one selected from the group consisting of Formula (13)-Formula (16).

$$R_8\text{—}O\text{—}R_9\text{—}NH_2 \quad \text{Formula (13)}$$

($R_8$ is an alkylene group having 1 to 20 carbon atoms, alkenyl group having 1 to 20 carbon atoms or aryl group having 1 to 20 carbon atoms, may contain an oxygen atom. Also, $R_9$ is an alkylene group having 1 to 20 carbon atoms, alkenylene group having 1 to 20 carbon atoms or arylene group having 1 to 20 carbon atoms, may contain an oxygen atom.)

Formula (14)

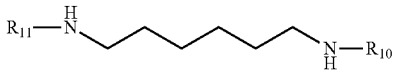

($R_{10}$ and $R_{11}$ are each independently a hydrogen atom, an alkyl group having 1 to 20 carbon atoms, alkenyl group having 1 to 20 carbon atoms or aryl group having 1 to 20 carbon atoms.)

Formula (15)

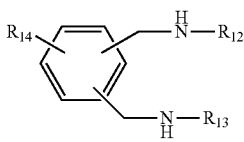

($R_{12}$, $R_{13}$ and $R_{14}$ are each independently a hydrogen atom, an alkyl group having 1 to 20 carbon atoms, alkenyl group having 1 to 20 carbon atoms or aryl group having 1 to 20 carbon atoms, may contain an oxygen atom.)

$$R_{15}\text{—}NH_2 \quad \text{Formula (16)}$$

($R_{15}$ is each independently an alkyl group having 1 to 20 carbon atoms, alkenyl group having 1 to 20 carbon atoms or aryl group having 1 to 20 carbon atoms, may contain an oxygen atom.)

Also, one of the present inventions is to provide
[8] the thermally expandable resin composition described in any one of the [1] to [7], in which said inorganic filler contains a phosphorus compound and a metal compound.

Also, one of the present inventions is to provide
[9] the thermally expandable resin composition described in any one of the [1] to [8], in which said inorganic filler is at least one selected from the group consisting of ammonium polyphosphate, calcium carbonate, melamine polyphosphate and titanium oxide.

Also, one of the present inventions is to provide
[10] the thermally expandable resin composition described in any one of the [1] to [9], which is used in refractory coating materials for pillars, beams and walls, in fireproof sashes, in fireproof compartment passage structures, in fireproof doors.

Effects of the Invention

A thermally expandable resin composition of the present invention can give molded bodies having excellent fire resistance, stress at break after thermal expansion and relatively low elastic modulus.

EMBODIMENTS TO CARRY OUT THE INVENTION

A brominated epoxy compound to be used in an epoxy resin to be used in the present invention is firstly explained.
Said brominated epoxy compound is represented by the Formula (21).

Formula (21)

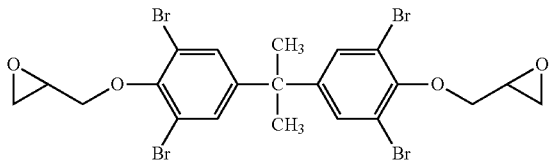

Said brominated epoxy compound can be obtained by the method in which a brominated bisphenol compound represented by the Formula (22) is reacted with an epichlorohydrin.

Formula (22)

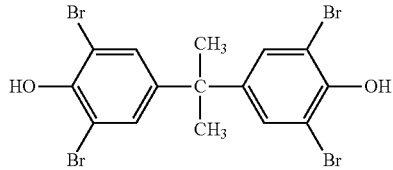

Incidentally, when a brominated bisphenol compound represented by said Formula (22) is glycidyl-etherified, it contains components produced by the reaction in the manufacturing process such as self-condensate by the reaction of a hydroxyl group contained in said brominated bisphenol compound with a glycidyl group and a reactant adding water to a glycidyl group, etc., in some cases. The case of a compound which contains the following glycidyl ether group is the same as above.

Next, said bisphenol-type epoxy compound to be used in the present invention is explained.

Said bisphenol-type epoxy compound is represented by the Formula (1).

Formula (1)

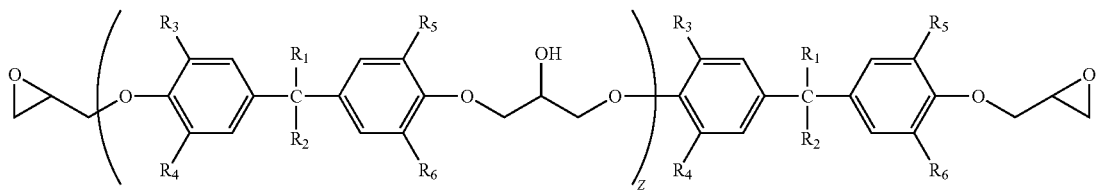

Here, $R_1$ and $R_2$ each independently a hydrogen atom or a methyl group, $R_3$-$R_6$ are each independently any one of a hydrogen atom or a methyl group. Z is a repeating unit ranging from 1 to 100.

A bisphenol-type epoxy compound to be used in the present invention may be specifically mentioned, for example, a material represented by the Formula (17)-Formula (18), etc.

Formula (17)

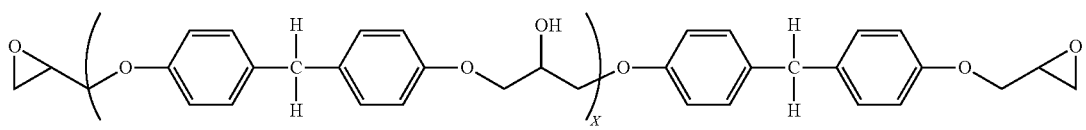

Here, X is a repeating unit ranging from 1 to 100.
Said Formula (17) is corresponding to the case that $R_1$-$R_6$ of said Formula (1) are hydrogen atoms.

Formula (18)

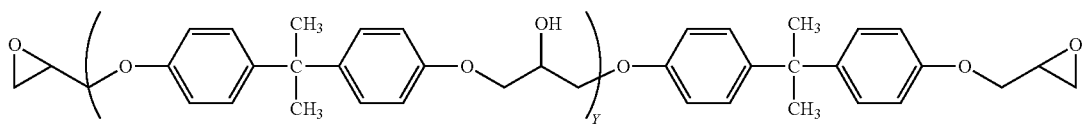

Y is a repeating unit ranging from 1 to 100.
Said Formula (18) is corresponding to the case that $R_1$ and $R_2$ of said Formula (1) are methyl groups, $R_3$-$R_6$ are hydrogen atoms.

A kind or two or more kinds of said bisphenol-type epoxy compound may be used.

Also, an aliphatic epoxy compound to be used in the present invention is represented by the Formula (2).

Formula (2)

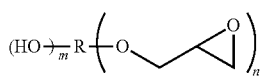

Here, R is an alkylene group having 1 to 500 carbon atoms, and can contain an oxygen atom. Also, n is a repeating unit ranging from 2 to 4, m is a repeating unit ranging from 0 to 1 and n+m is the range of 2-4.

An aliphatic epoxy compound to be used in the present invention may be mentioned, for example, a bifunctional aliphatic epoxy compound and a polyfunctional aliphatic epoxy compound having three or more functional groups, etc.

A kind or two or more kinds of said aliphatic epoxy compound may be used.

An aliphatic epoxy compound to be used in the present invention may be specifically mentioned, for example, a bifunctional aliphatic epoxy compound represented by the Formula (3).

Formula (3)

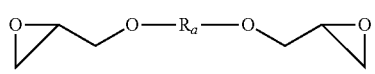

Here, $R_a$ is a hydrocarbon radical having 1 to 500 carbon atoms, and can contain an oxygen atom.

Said Formula (3) may be specifically mentioned, for example, the Formula (3-1), (3-2), etc.

Formula (3-1)

$$\underset{\text{O}}{\triangle}\!\!\!\!\diagdown\!\!\text{O}\!\!-\!\!(\text{R}_b\!-\!\text{O})_r\!\!\diagdown\!\!\underset{\text{O}}{\triangle}$$

Here, Rb is an alkylene group having 2 to 4 carbon atoms. Said alkylene group may be mentioned, for example, an ethylene group, a propylene group, a butylene group and isomers of these. Also, r is a repeating unit ranging from 1 to 500, preferably a repeating unit ranging from 2 to 500.

Formula (3-2)

$$\underset{\text{O}}{\triangle}\!\!\!\!\diagdown\!\!\text{O}\!\!-\!\!\text{R}_c\!\!-\!\!\text{O}\!\!\diagdown\!\!\underset{\text{O}}{\triangle}$$

$R_c$ is an alkylene group having 2 to 10 carbon atoms. Said alkylene group may be mentioned, for example, an ethylene group, a propylene group, a butylene group, a pentylene group, a hexylene group, a heptylene group, an octylene group, a nonylene group, a decanylene group and isomers of these.

$R_c$ is preferably an alkylene group having 2 to 6 carbon atoms.

A bifunctional aliphatic epoxy compound to be used in the present invention may be mentioned, for example, a material represented by the Formula (4)-Formula (9), etc.

Formula (4)

Formula (5)

Here, $R_7$ is an alkylene group having 1 to 20 carbon atoms, alkenylene group having 1 to 20 carbon atoms or arylene group having 1 to 20 carbon atoms Formula (6)

s is a repeating unit ranging from 1 to 500.

Formula (7)

t is a repeating unit ranging from 1 to 500.

Formula (8)

u is a repeating unit ranging from 1 to 500.

Formula (9)

An aliphatic epoxy compound to be used in the present invention may be specifically mentioned, for example, a polyfunctional aliphatic epoxy compound having three or more functional groups represented by the Formula (2a).

Formula (2a)

$$(\text{HO})_p\!\!-\!\!\text{R}\!\!-\!\!\left(\text{O}\!\!\diagdown\!\!\underset{\text{O}}{\triangle}\right)_q$$

R is an alkylene group having 1 to 500 carbon atoms, and can contain an oxygen atom. q is a repeating unit ranging from 3 to 4. p is a repeating unit ranging from 0 to 1 and p+q is the range of 3-4.

A polyfunctional aliphatic epoxy compound having three or more functional groups may be specifically mentioned, for example, the Formula (10)-Formula (12), etc.

Formula (10)

Formula (11)

Formula (12)

-continued

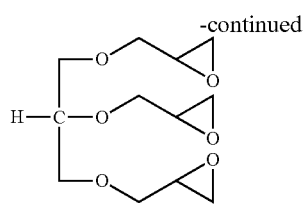

Next, a combination of said brominated epoxy epoxy compound and at least one of a bisphenol-type epoxy compound and an aliphatic epoxy compound is explained.

[(Z) a Combination of Said Brominated Epoxy Epoxy Compound and at Least One of a Bisphenol-Type Epoxy Compound and an Aliphatic Epoxy Compound]

Formula (21)

(Z-1)

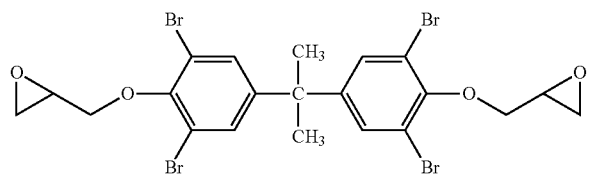

Formula (17)

(Z-3)

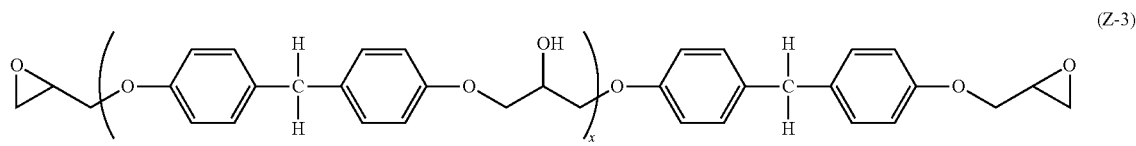

(X is a repeating unit ranging from 1 to 500.)

Formula (18)

(Z-4)

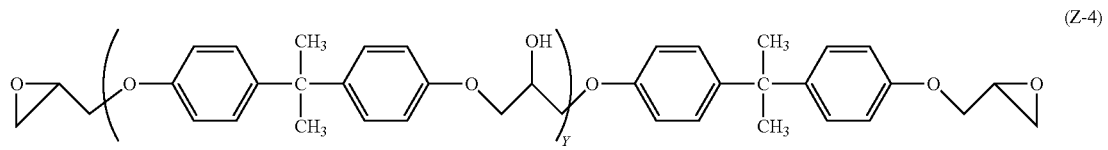

(Y is a repeating unit ranging from 1 to 500.)

Formula (4)

(Z-5)

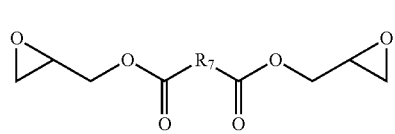

Formula (5)

(Z-6)

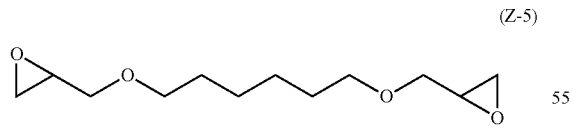

($R_7$ is an alkylene group having 1 to 20 carbon atoms, alkenylene group having 1 to 20 carbon atoms or arylene group having 1 to 20 carbon atoms.)

Formula (6)

(Z-7)

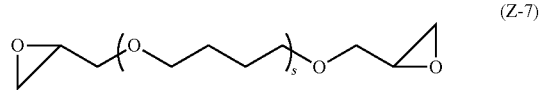

(s is a repeating unit ranging from 1 to 500.)

Formula (7)

(Z-8)

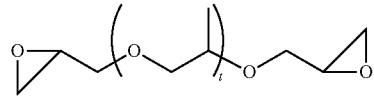

(t is a repeating unit ranging from 1 to 500.)

Formula (8)

(Z-9)

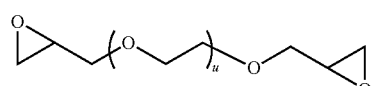

(u is a repeating unit ranging from 1 to 500.)

Formula (9)

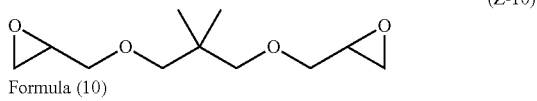
(Z-10)

Formula (10)

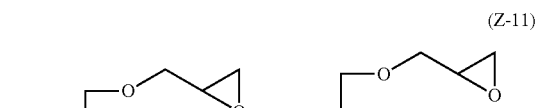
(Z-11)

Formula (11)

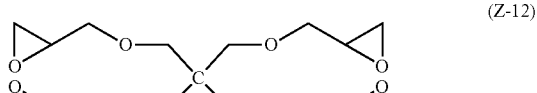
(Z-12)

Formula (12)

(Z-13)

For example, a combination of at least one of said (Z-1) and (Z-2) as an essential component and at least one selected from the group consisting of said (Z-3)-(Z-13) may be mentioned.

Molded bodies obtained by molding a thermally expandable resin composition using a combination of the a brominated epoxy epoxy compound and at least one of a bisphenol-type epoxy compound and an aliphatic epoxy compound have low elastic modulus, excellent fire resistance and stress at break after thermal expansion.

A bisphenol-type epoxy compound and an aliphatic epoxy compound to be used in the present invention are preferably at least one selected from the group consisting of said Formula (4)-Formula (12), are more preferably at least one selected from the group consisting of Formula (8), Formula (10) and Formula (11).

Next, a mixing ratio of said brominated epoxy epoxy compound to at least one of said bisphenol-type epoxy compound and aliphatic epoxy compound is explained.

A mixing ratio of said brominated epoxy epoxy compound to at least one of said bisphenol-type epoxy compound and aliphatic epoxy compound ranges from 99:1 to 1:99 in weight.

When said brominated epoxy epoxy compound and said bisphenol-type epoxy compound are used in combination, an expansion residue obtained after thermal expansion is expected to have good hardness. Therefore, a mixing ratio of said brominated epoxy epoxy compound to said bisphenol-type epoxy compound preferably ranges from 95:5 to 5:95 in weight.

Also, a mixing ratio of said brominated epoxy epoxy compound to said bisphenol-type epoxy compound more preferably ranges from 50:50 to 5:95, further preferably ranges from 30:70 to 10:90, most preferably ranges from 25:75 to 15:85 in weight because compatibility between said brominated epoxy epoxy compound and said bisphenol-type epoxy compound is improved, and a thermally expandable resin composition according to the present invention is easily handled.

Also, when said brominated epoxy epoxy compound and said aliphatic epoxy compound are used in combination, a thermally expandable resin composition according to the present invention is easily handled, and fire resistance does not reduce much. Therefore, a mixing ratio of said brominated epoxy epoxy compound to said aliphatic epoxy compound preferably ranges from 95:5 to 5:95, more preferably ranges from 95:5 to 10:90, further preferably ranges from 95:5 to 50:50, most preferably ranges from 95:5 to 80:20 in weight.

Next, an epoxy curing agent contained in an epoxy resin to be used in the present invention is explained.

An epoxy curing agent to be used in the present invention contains an amino compound.

For example, an amino compound-containing epoxy curing agent which contains the Formula (13)-Formula (16), etc. may be specifically mentioned.

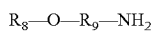 Formula (13)

($R_8$ is an alkyl group having 1 to 20 carbon atoms, alkenyl group having 1 to 20 carbon atoms or aryl group having 1 to 20 carbon atoms. Also, $R_9$ is an alkylene group having 1 to 20 carbon atoms, alkenylene group having 1 to 20 carbon atoms or arylene group having 1 to 20 carbon atoms.)

Formula (14)

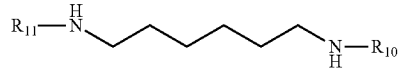

($R_{10}$ and $R_{11}$ are each independently a hydrogen atom, an alkyl group having 1 to 20 carbon atoms, alkenyl group having 1 to 20 carbon atoms or aryl group having 1 to 20 carbon atoms.)

Formula (15)

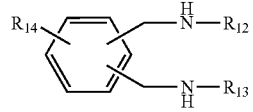

($R_{12}$, $R_{13}$ and $R_{14}$ are each independently a hydrogen atom, an alkyl group having 1 to 20 carbon atoms, alkenyl group having 1 to 20 carbon atoms or aryl group having 1 to 20 carbon atoms.)

 Formula (16)

($R_{15}$ is each independently an alkyl group having 1 to 20 carbon atoms, alkenyl group having 1 to 20 carbon atoms or aryl group having 1 to 20 carbon atoms.)

For an amino compound-containing epoxy curing agent to be used in the present invention, a kind or two or more kinds of the Formula (13)-Formula (16) may be preferably used.

For an amino compound-containing epoxy curing agent, 3-lauryloxypropylamine, hexamethylenediamine, oleylamine, xylenediamine and derivatives of these, etc. may be more preferably used.

Next, an inorganic filler is explained.

Said inorganic filler is not particularly limited, and may be specifically mentioned, for example, zinc borate, boric acid, boric oxide, silica, diatomaceous earth, alumina, zinc oxide, titanium oxide, calcium oxide, magnesium oxide, ferric oxide, tin oxide, antimony oxide, ferrite, calcium hydroxide, magnesium hydroxide, aluminum hydroxide, basic magnesium carbonate, calcium carbonate, magnesium carbonate, zinc carbonate, barium carbonate, dawsonite, potassium salt such as hydrotalcite, calcium sulfate, barium sulfate, gypsum fibers, calcium silicate, talc, clay, mica, montmorillonite, bentonite, activated clay, sepiolite, imogolite, sericite, glass fibers, glass beads, silica series balloons, aluminum nitride, boron nitride, silicon nitride, carbon black, graphite, carbon fibers, carbon balloons, charcoal powder, various metal powders, potassium titanate, magnesium sulfate, lead zirconia titanate, aluminum borate, molybdenum sulfide, silicon carbide, stainless fibers, zinc borate, various magnetic powders, slag fibers, fly ash, inorganic series phosphorus compound, silica-alumina fiber, alumina fiber, silica fiber, zirconia fiber, etc.

A kind or two or more kinds of these may be used.

Also, a phosphorus compound and a thermally expandable component, etc. may be added to a thermally expandable resin composition to be used in the present invention The phosphorus compound is not particularly limited, and may be mentioned, for example, red phosphorus, various kinds of phosphoric acid ester such as triphenyl phosphate, tricresyl phosphate, trixylenyl phosphate, cresyldiphenyl phosphate, xylenyldiphenyl phosphate, etc., bisphenol A-derived condensed phosphoric ester such as PX-200 (available from Daihachi Chemical Industry Co., Ltd.), CR-733S (available from Daihachi Chemical Industry Co., Ltd.), etc., condensed type phosphoric ester such as xylenol-derived condensed phosphoric ester such as CR-741S (available from Daihachi Chemical Industry Co., Ltd.), etc., Halogen-containing phosphoric ester which contains halogen such as chlorine, etc. in the structure of the phosphoric ester and condensed type phosphoric ester, and Halogen-containing condensed type phosphoric ester, a phosphate metallic salt such as sodium phosphate, potassium phosphate, magnesium phosphate, etc., ammonium polyphosphates, compounds represented by the Formula (19), etc.

A kind or two or more kinds of these phosphorus compound may be used.

Among these, in the viewpoint of fireproof properties, red phosphorus, the compound represented by the chemical formula, and ammonium polyphosphates are preferred, and ammonium polyphosphates are more preferred in the points of properties, safety, cost, etc.

Formula (19)

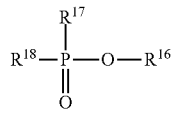

In the Formula (19), $R^{16}$ and $R^{18}$ represent hydrogen, a linear or branched alkyl group having 1 to 16 carbon atoms or an aryl group having 6 to 16 carbon atoms.

$R^{17}$ represents a hydroxyl group, a linear or branched alkyl group having 1 to 16 carbon atoms, a linear or branched alkoxyl group having 1 to 16 carbon atoms, an aryl group having 6 to 16 carbon atoms, or an aryloxy group having 6 to 16 carbon atoms.

The compound represented by the chemical formula may be mentioned, for example, methylphosphonic acid, methylphosphonic acid dimethyl, methylphosphonic acid diethyl, ethylphosphonic acid, propylphosphonic acid, buthylphosphonic acid, 2-methylpropylphosphonic acid, t-buthylphosphonic acid, 2,3-dimethyl-buthylphosphonic acid, octylphosphonic acid, phenylphosphonic acid, dioctylphenyl phosphonate, dimethyl phosphinic acid, methylethyl phosphinic acid, methylpropyl phosphinic acid, diethyl phosphinic acid, dioctyl phosphinic acid, phenyl phosphinic acid, diethylphenyl phosphinic acid, diphenyl phosphinic acid and bis(4-methoxyphenyl)phosphinic acid, etc.

Above all, whereas t-butylphosphonic acid is expensive, it is preferred in the point of high fire retardant properties.

Whereas ammonium polyphosphates are not particularly limited, and may be mentioned, for example, ammonium polyphosphate, melamine-modified ammonium polyphosphate, ammonium polyphosphate, piperazine polyphosphate, ammonium polyphosphate amide, and said ammonium polyphosphates to which melamine and/or pentaerythritol, etc. are added as a foaming agent, in the points of fire retardant properties, safety, a cost, handling properties, etc., ammonium polyphosphate is preferred.

Commercially available products may be mentioned, for example, "trade name: EXOLIT AP422" and "trade name: EXOLIT AP462" available from Clariant K.K., etc.

The phosphorus compound is considered to promote expansion of the metal carbonate by reacting with a metal carbonate such as calcium carbonate, zinc carbonate, etc., and in particular, when ammonium polyphosphate is used as the phosphorus compound, high expansion effect can be obtained. Also, it acts as an effective aggregate, and forms a residue having high shape retaining properties after burning.

Next, said thermally expandable graphite is explained.

Said thermally expandable graphite is a material which expands at the time of heating, and it is possible to obtain a material having a different thermal expansion initiation temperature as commercially available products.

Said thermally expandable graphite is a conventionally known material, which is a graphite intercalation compound formed by treating powder such as natural scaly graphite, pyrolytic graphite, kish graphite, etc., with an inorganic acid such as conc. sulfuric acid, nitric acid, selenic acid, etc., and a strong oxidizing agent such as conc. nitric acid, perchloric acid, a perchlorate, a permanganate, a dichromate, hydrogen peroxide, etc., and is a kind of a crystalline compound which retains a layered structure of the carbon.

The thermally expandable graphite obtained by subjecting to an acid treatment as mentioned above is preferably used by further neutralizing with ammonia, an aliphatic lower amine, an alkali metal compound, an alkaline earth metal compound, etc.

Said aliphatic lower amine may be mentioned, for example, monomethylamine, dimethylamine, trimethylamine, ethylamine, propylamine, butylamine, etc.

Said alkali metal compound and said alkaline earth metal compound may be mentioned, for example, a hydroxide, an oxide, a carbonate, a sulfate, an organic acid salt, etc., such as potassium, sodium, calcium, barium, magnesium, etc.

A grain size of the thermally expandable graphite is preferably a material in the range of 20-200 mesh.

If the grain size is less than 20 mesh, a degree of expansion of the graphite is small, and a sufficient expansion residue can be difficultly obtained, while if the grain size becomes large exceeding 200 mesh, there is a merit that a degree of expansion of the graphite is large, but dispersibility becomes poor when it is mixed and kneaded with said the epoxy resin, and physical properties are likely lowered.

Commercially available products of the thermally expandable graphite subjected to neutralization treatment may be mentioned, for example, "GRAFGUARD#160" and "GRAFGUARD#220" available from UCAR CARBON Co., Inc., and "GREP-EG" available from Tosoh Corporation, etc.

Also, said inorganic filler that is used in a thermally expandable resin composition layer which acts as a role of an aggregate, and contributes to improve strength of the expansion residue formed after heating or to increase heat capacity of the same is preferred.

More specifically, a metal carbonate represented by calcium carbonate and zinc carbonate, and a hydrated inorganic product represented by aluminum hydroxide and magnesium hydroxide which act as a role like an aggregate as well as provide a heat absorption effect at the time of heating are preferred, and an alkali metal, an alkaline earth metal, and a metal carbonate of Group IIb of the Periodic Table or a mixture of these compounds and the hydrated inorganic product are preferred.

When an inorganic filler to be used in the present invention is a particulate, the particle size is preferably within the range of 0.5-200 μm, more preferably within the range of 1-50 μm.

When the amount of the inorganic filler to be added is a little, the dispersibility markedly affects the properties so that a material having a small particle size is preferred, and when the particle size is 0.5 μm or more, secondary aggregation can be prevented and deterioration of dispersibility can be prevented.

Also, when an amount of the inorganic filler to be added is much, a viscosity of the resin composition becomes high with the progress of highly filling, and moldability is lowered, but in the point that the viscosity of the resin composition can be lowered by making the particle size large, that a material having a large particle size is preferred among the range.

Incidentally, if the particle size is 200 μm or less, lowering in surface properties of the molded product and the mechanical properties of the resin composition can be prevented.

A metal carbonate, a metal oxide such as titanium oxide, zinc oxide, etc. which acts as a role like an aggregate in the same way, a hydrated inorganic product such as aluminum hydroxide and magnesium hydroxide, etc. which act as a role like an aggregate as well as provide a heat absorption effect at the time of heating are preferably used; among these, a metal carbonate or a metal oxide is more preferably used because their effect of an aggregate is high; calcium carbonate, titanium oxide, zinc oxide, silicon oxide are further preferably used; and calcium carbonate is most preferably used.

When a particle size of the hydrated inorganic product is small, the bulk becomes large and highly filling becomes difficult so that a material having a large particle size is preferred to accomplish higher filling for heightening the dehydration effect. More specifically, when the particle size is 18 μm, it has been known that a filling limit amount increases about 1.5-fold as compared with that of the particle size of 1.5 μm. Further, higher filling is possible by using a material having large particle size and a material having small particle size in combination.

Commercially available products of said hydrated inorganic product may be mentioned, for example, as aluminum hydroxide, "trade name: HIGILITE H-42M" (available from SHOWA DENKO K.K.) having a particle size of 1 μm, "trade name: HIGILITE H-31" (available from SHOWA DENKO K.K.) having a particle size of 18 μm, etc.

Commercially available products of said calcium carbonate may be mentioned, for example, "trade name: Whiton SB Red" (available from SHIRAISHI CALCIUM KAISHA, Ltd.) having a particle size of 1.8 μm, "trade name: BF300" (available from BIHOKU FUNKA KOGYO CO., LTD.) having a particle size of 8 μm, etc.

Next, the formulation of an epoxy resin, a phosphorus compound as an inorganic filler, and a thermally expandable resin composition, etc. which contain a thermally expandable graphite, etc. is explained.

Said thermally expandable resin composition preferably contains said thermally expandable graphite in the range of 20 to 350 parts by weight and said inorganic filler in the range of 50 to 400 parts by weight based on 100 parts by weight of said epoxy resin. Also, the sum of said thermally expandable graphite and said inorganic filler is preferably in the range of 200 to 600 parts by weight.

Such a thermally expandable resin composition expands by heat to form an expansion residue. According to this formulation, said thermally expandable resin composition expands by heat such as a fire, etc., and a necessary volume expansion rate can be obtained. After the expansion, a residue having a predetermined heat insulating properties as well as a predetermined strength can be formed, and a stable fireproof performance can be accomplished.

If the amount of said thermally expandable graphite is 20 or more parts by weight, an expansion ratio is improved, and sufficient fire resistance and fireproof performance can be obtained.

On the other hand, if the amount of a thermally expandable graphite is 350 or less parts by weight, a cohesive force is improved, and a strength of a molded product increased.

Also, if the amount of said inorganic filler is 50 or more parts by weight, the amount of a residual volume after burning can be kept, so that a sufficient expansion residue can be obtained. Further, a ratio of the combustible material is decreased, so that fire retardant properties are improved.

On the other hand, if the amount of an inorganic filler is 400 or less parts by weight, a formulation ratio of an epoxy resin is increased, so that a sufficient cohesive force can be obtained, and strength as a molded product can be kept.

If the total amount of a thermally expandable graphite and an inorganic filler in said thermally expandable resin composition is 200 or more parts by weight, the amount of a thermal expansion residue after burning can be kept, and sufficient fireproof performance can be obtained, while if it is 600 or less parts by weight, lowering in mechanical properties can be prevented and it can be endured for a long time.

Further, said resin composition and thermally expandable resin composition to be used in the present invention may contain, in addition to an antioxidant such as a phenol series, an amine series, a sulfur series, etc., an additive such as a metal damage preventing agent, an antistatic agent, a stabilizer, a cross-linking agent, a lubricant, a softening agent, a pigment, etc., and a tackifier such as a polybutene, a petroleum resin, etc., if necessary, within the range which does not impair the objects of the present invention.

Next, a manufacturing method of said thermally expandable resin composition is explained.

The manufacturing method of said thermally expandable resin composition is not particularly limited, and said thermally expandable resin composition can be obtained, for example, by the method in which said thermally expandable resin composition is suspended in an organic solvent or melted by heating to prepare a paint state respectively, the method in which it is dispersed in an organic solvent to prepare a slurry, etc. or the method in which said thermally expandable resin composition is melted under heating, etc.

Above all, a step to remove an organic solvent is not necessary, so that not to use an organic solvent is preferred.

Said thermally expandable resin composition can be obtained by mixing and kneading the respective components by using a conventionally known device such as a single screw extruder, a twin screw extruder, a Bunbary mixer, a mixing and kneading roller, a Raikai mixer, a planetary stirring machine, etc.

Also, when said thermally expandable resin composition is manufactured, unreacted components of an epoxy resin and an epoxy curing agent are separately mixed and kneaded with a filler, and the material can be obtained by mixing and kneading these immediately before the molding by using a static mixer, a dynamic mixer, etc.

The present invention is explained in more detail on the basis of Examples below, but the present invention is not limited by the following Examples.

Example 1

[(Z) A Combination of Said Brominated Epoxy Epoxy Compound and at Least One of a Bisphenol-Type Epoxy Compound and an Aliphatic Epoxy Compound]

90 parts by weight of a thermally expandable graphite (available from Tosoh Corporation, trade name: GREP-EG. Hereinafter referred to as "C-2".), as a kind of an inorganic filler, 90 parts by weight of calcium carbonate (available from BIHOKU FUNKA KOGYO CO., LTD., trade name: Whiton BF-300. Hereinafter referred to as "C-3".), as a kind of an inorganic filler, are weighed to 370 g in total by a three neck flask of 1000 mL, and a thermally expandable resin composition is made by stirring for 10 minutes at a temperature of 25° C. using a mechanical stirrer.

The obtained thermally expandable resin composition 170 g is putted between polyethylene terephthalate sheets subjected to releasing treatment to be 25 cm×25 cm×2 mm, and a thermally expandable resin composition sheet is made by pressing for 30 seconds at a temperature of 40° C. using a heating electric press.

An epoxy resin sheet is made by heating said thermally expandable resin composition sheet to be cured for 24 hours at a temperature of 90° C. using an oven.

Also, the obtained thermally expandable resin composition 135 g is putted between polyethylene terephthalate sheets subjected to releasing treatment to be 25 cm×25 cm×1.5 mm, and a thermally expandable resin composition sheet is made by pressing for 30 seconds at a temperature of 40° C. using a heating electric press. An epoxy resin sheet is made by heating said thermally expandable resin composition sheet to be cured for 24 hours at a temperature of 90° C. using an oven.

Formula (21)

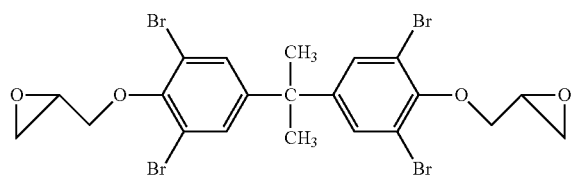

(Z-1)

Formula (17)

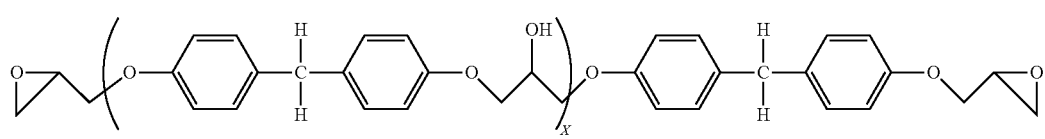

(Z-3)

(X is a repeating unit ranging from 1 to 100.)

10.9 parts by weight of tetrabromobisphenol-A-diglycidyl-ether (available from Nippon Steel Chemical Co., Ltd., trade name: YDB-400, an epoxy equivalent: 403.1 g/eq. Hereinafter referred to as "A-10".) as the (Z-1), 45.4 parts by weight of bisphenol-F-diglycidyl-ether (available from Mitsubishi Chemical Corporation, trade name: E807, an epoxy equivalent: 168 g/eq. Hereinafter referred to as "A-1".) as the (Z-3), 43.7 parts by weight of an amino compound which is prepared by mixing 3-lauryloxypropyl-1-amine with hexamethylenediamine derivative (available from Mitsubishi Chemical Corporation, trade name: FL052) at a weight ratio of 6:4 (an amine equivalent: 167.3 g/eq., on the basis of the active hydrogen. Hereinafter referred to as "B-1".), as an epoxy curing agent, 90 parts by weight of ammonium polyphosphates (available from Clariant K.K. trade name: AP-422. Hereinafter referred to as "C-1".), as a kind of an inorganic filler, The test of stress at break is carried out using the obtained 1.5 mm epoxy resin sheet. Also, measurement of elastic modulus is carried out using the 2 mm epoxy resin sheet.

Incidentally, (A) components ("A-1" and "A-10") and (B) components ("B-1") are mixed in accordance with the ratio which makes the ratio of an epoxy equivalent of an epoxy monomer to an active hydrogen equivalent of a curing agent 105:100-100:105. This relation is the same for the following cases.

The obtained epoxy resin sheet is evaluated on the following criteria.

[Stress at Break]
A specimen of 98 mm×98 mm×1.5 mm is heated in an electric furnace for 30 minutes at a temperature of 600° C. using the present invention product and the comparative invention product obtained from the manufacturing examples.

Measurement of stress at break is an index of shape retaining properties of a thermally expandable inorganic material of the present invention product and the comparative invention product after thermal expansion; stress at break of a sample after heating is measured using a compression testing machine (available from Kato tech Co., Ltd. "Finger Feeling Tester") by a 0.25 cm² penetrator at 0.1 cm/s in compression speed.

[Bending Elastic Modulus]

Bending elastic modulus of the present invention product and comparative invention product is measured under temperature: 0° C., test speed: 5 mm/s, specimen: W25 mm×L30 mm×T2 mm, inter-fulcrum distance: 24 mm, on JIS K7171 using Tenshiron available from Orientec Co., Ltd.

In the case of (Z) a combination of said brominated epoxy epoxy compound and at least one of a bisphenol-type epoxy compound and an aliphatic epoxy compound, said stress at break is preferably 0.6 kgf or more, and elastic modulus is preferably 50 N/mm² or less.

The results are shown in Table 1.

As is evident from Table 1, an epoxy resin sheet obtained by curing a thermally expandable resin composition according to Example 1 is relatively low in elastic modulus, and is excellent in fire resistance and stress at break.

The formulation used in Example 1 and the results are shown in Table 1.

Example 2

In the case of Example 1, 11.2 parts by weight of "A-10" are used, 39.3 parts by weight of "A-1" are used. Also, in addition to "A-10" and "A-1", the (Z-6) is used.

Formula (5)

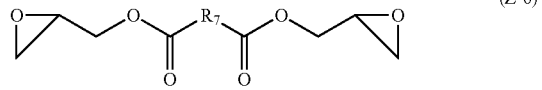
(Z-6)

(R₇ is an alkylene group having 1 to 20 carbon atoms, alkenylene group having 1 to 20 carbon atoms or arylene group having 1 to 20 carbon atoms.)

As the (Z-6), 4.7 parts by weight of dimer-modified epoxy (an epoxy equivalent: 422 g/eq. Hereinafter referred to as "A-3".) are used.

Also, 43.9 parts by weight of "B-1" are used. The formulation used in Example 2 and the results are shown in Table 1.

Example 3

In the case of Example 1, 31.6 parts by weight of "A-10" are used; the (Z-5) is used instead of "A-1".

Formula (4)

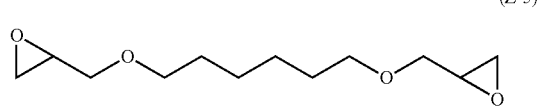
(Z-5)

As the (Z-5), 31.5 parts by weight of hexamethylene diglycidyl ether (an epoxy equivalent: 157 g/eq. Hereinafter referred to as "A-2".)

Also, completely the same experiment as in Example 1 is carried out, except that 36.9 parts by weight of "B-1" are used.

The formulation used in Example 3 and the results are shown in Table 1.

Example 4

Completely the same experiment as in Example 1 is carried out, except that 54.4 parts by weight of "A-10" are used, 13.6 parts by weight of "A-1" are used, and 32.0 parts by weight of "B-1" are used.

The formulation used in Example 4 and the results are shown in Table 1.

Example 5

In the case of Example 1, 54.6 parts by weight of "A-10", 13.6 parts by weight of "A-1" are used.

Also, completely the same experiment as in Example 1 is carried out, except that 31.8 parts by weight of a mixture of a xylenediamine derivative:oleylamine=6:4 (an active hydrogen equivalent: 165.0 g/eq. A xylenediamine derivative is prepared by reacting 1 mole of butylglycidyl ether and 1 mole of dodecylglycidyl ether with 1 mole of metaxylenediamine. Hereinafter referred to as "B-2".) are used as an epoxy curing agent instead of "B-1".

The formulation used in Example 5 and the results are shown in Table 1.

Example 6

In the case of Example 1, completely the same experiment as in Example 1 is carried out, except that 62.4 parts by weight of "A-10", 7.0 parts by weight of "A-1", 30.6 parts by weight of "B-1" are used.

The formulation used in Example 6 and the results are shown in Table 1.

Example 7

In the case of Example 1, 55.4 parts by weight of "A-10" are used.

Also, the (Z-9) is used instead of "A-1".

Formula (8)

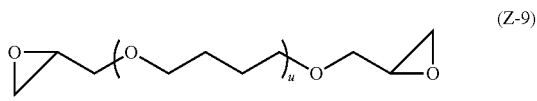
(Z-9)

(u is a repeating unit ranging from 1 to 500.)

As the (Z-9), 13.8 parts by weight of polyethylene glycol glycidyl ether (available from Nagase ChemteX Corporation, a polymerization degree average 9, EX-830, an epoxy equivalent: 268 g/eq. Hereinafter referred to as "A-6".)

Also, completely the same experiment as in Example 1 is carried out, except that 30.8 parts by weight of "B-1" are used.

The formulation used in Example 7 and the results are shown in Table 1.

Example 8

In the case of Example 1, 55.4 parts by weight of "A-10" are used, 13.8 parts by weight of "A-6" instead of "A-1".

Also, completely the same experiment as in Example 1 is carried out, except that 30.8 parts by weight of "B-2" instead of "B-1".

The formulation used in Example 8 and the results are shown in Table 1.

Example 9

In the case of Example 1, 52.7 parts by weight of "A-10" are used.

Also, the (Z-4) is used instead of "A-1".

Formula (18)

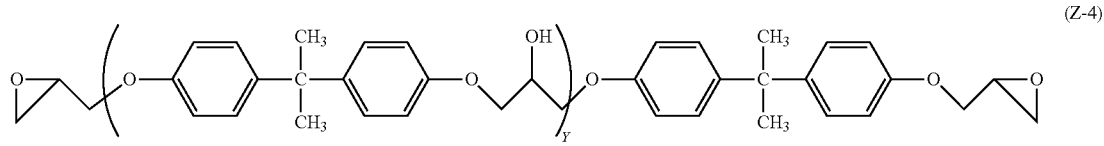

(Y is a repeating unit ranging from 1 to 100.)

As the (Z-4), 15.7 parts by weight of bisphenol-A-type epoxy monomer (available from Mitsubishi Chemical Corporation, trade name: E828, an epoxy equivalent: 179 g/eq. Hereinafter referred to as "A-13".) are used.

Also, completely the same experiment as in Example 1 is carried out, except that 31.6 parts by weight of "B-2" are used instead of "B-1".

The formulation used in Example 9 and the results are shown in Table 1.

Example 10

In the case of Example 1, 54.6 parts by weight of "A-10" are used, 13.6 parts by weight of "A-1" are used.

Also, 31.8 parts by weight of "B-2" are used instead of "B-1".

Also, completely the same experiment as in Example 1 is carried out, except that 90 parts by weight of titanium oxide (available from Kishida Chemical Co., Ltd., product code: 020-78675. Hereinafter referred to as "C-5".) are used as a kind of an inorganic filler instead of an inorganic filler "C-3".

The formulation used in Example 10 and the results are shown in Table 1.

Example 11

In the case of Example 1, 54.6 parts by weight of "A-10" are used, 13.6 parts by weight of "A-1" are used.

Also, 31.8 parts by weight of "B-2" are used instead of "B-1".

Also, completely the same experiment as in Example 1 is carried out, except that 90 parts by weight of melamine polyphosphate (available from Nissan Chemical Industries, Ltd., trade name: PHOSMEL-200. Hereinafter referred to as "C-4".) are used as a kind of an inorganic filler instead of an inorganic filler "C-1".

The formulation used in Example 11 and the results are shown in Table 1.

Comparative Example 1

In the case of Example 1, 41.3 parts by weight of "A-1" are used, 10.3 parts by weight of "A-3" are used instead of "A-10", and 48.4 parts by weight of "B-1" are used. Also, completely the same experiment as in Example 1 is carried out, except that "A-10" is not used.

The formulation used in Comparative Example 1 and the results are shown in Table 2.

Comparative Example 2

In the case of Example 1, 40.0 parts by weight of "A-1" are used, 10.0 parts by weight of "A-2" are used, and 50.0 parts by weight of "B-2" are used instead of "B-1". Also, completely the same experiment as in Example 1 is carried out, except that "A-10" is not used.

The formulation used in Comparative Example 2 and the results are shown in Table 2.

Comparative Example 3

In the case of Comparative Example 1, 50.0 parts by weights of "A-1" are used, 50.0 parts by weights of "B-1" are used. Also, completely the same experiment as in Comparative Example 1 is carried out, except that "A-3" is not used.

The formulation used in Comparative Example 3 and results are shown in Table 2.

Comparative Example 4

In the case of Comparative Example 1, 47.1 parts by weight of "A-1" are used, 47.8 parts by weight of "B-1" are used. Also, completely the same experiment as in Comparative Example 1 is carried out, except that 5.1 parts by weight of "A-6" are used instead of "A-3".

The formulation used in Comparative Example 4 and results are shown in Table 2.

Comparative Example 5

In the case of Comparative Example 1, 47.9 parts by weight of "B-1" are used. Also, completely the same experiment as in Comparative Example 1 is carried out, except that the 52.1 parts by weight of "A-13" are used instead of "A-1" and "A-3".

The formulation used in Comparative Example 5 and results are shown in Table 2.

TABLE 1

| Example | | 1 | 2 | 3 | 4 | 5 | 6 | 7 | 8 | 9 | 10 | 11 |
|---|---|---|---|---|---|---|---|---|---|---|---|---|
| Epoxy | A-10 | 10.9 | 11.2 | 31.6 | 54.4 | 54.6 | 62.4 | 55.4 | 55.4 | 52.7 | 54.6 | 54.6 |
|  | A-1 | 45.4 | 39.3 | — | 13.6 | 13.6 | 7.0 | — | — | — | 13.6 | 13.6 |
|  | A-2 | — | — | 31.5 | — | — | — | — | — | — | — | — |
|  | A-3 | — | 4.7 | — | — | — | — | — | — | — | — | — |
|  | A-6 | — | — | — | — | — | — | 13.8 | 13.8 | — | — | — |
|  | A-13 | — | — | — | — | — | — | — | — | 15.7 | — | — |
| Curing Agent | B-1 | 43.7 | 43.9 | 36.9 | 32.0 | — | 30.6 | 30.8 | — | — | — | — |
|  | B-2 | — | — | — | — | 31.8 | — | — | 30.8 | 31.6 | 31.8 | 31.8 |
| Inorganic Filler (Including Graphite) | C-1 | 90 | 90 | 90 | 90 | 90 | 90 | 90 | 90 | 90 | 90 | — |
|  | C-2 | 90 | 90 | 90 | 90 | 90 | 90 | 90 | 90 | 90 | 90 | 90 |
|  | C-3 | 90 | 90 | 90 | 90 | 90 | 90 | 90 | 90 | 90 | — | 90 |
|  | C-4 | — | — | — | — | — | — | — | — | — | — | 90 |
|  | C-5 | — | — | — | — | — | — | — | — | — | 90 | — |
| Results | Stress at Break (kgf/cm$^2$) | 0.68 | 0.65 | 0.69 | 0.73 | 0.75 | 0.77 | 0.74 | 0.78 | 0.71 | 0.65 | 0.63 |
|  | Bending Elastic Modulus (N/mm$^2$) | 42.8 | 23.5 | 8.6 | 38.6 | 39.8 | 35.6 | 21.5 | 16.6 | 44.1 | 45.8 | 47.9 |

TABLE 2

| Comparative Example | | 1 | 2 | 3 | 4 | 5 |
|---|---|---|---|---|---|---|
| Epoxy | A-1 | 41.3 | 40.0 | 50.0 | 47.1 | — |
|  | A-2 | — | 10.0 | — | — | — |
|  | A-3 | 10.3 | — | — | — | — |
|  | A-6 | — | — | — | 5.1 | — |
|  | A-13 | — | — | — | — | 52.1 |
| Curing Agent | B-1 | 48.4 | — | 50.0 | 47.8 | 47.9 |
|  | B-2 | — | 50.0 | — | — | — |
| Inorganic Filler (Including Graphite) | C-1 | 90 | 90 | 90 | 90 | 90 |
|  | C-2 | 90 | 90 | 90 | 90 | 90 |
|  | C-3 | 90 | 90 | 90 | 90 | 90 |
| Results | Stress at Break (kgf/cm$^2$) | 0.37 | 0.40 | 0.58 | 0.52 | 0.59 |
|  | Bending Elastic Modulus (N/mm$^2$) | 6.28 | 6.8 | 46.3 | 20.6 | 53.1 |

UTILIZABLE FIELD IN INDUSTRY

The use of a thermally expandable resin composition according to the present invention is not particularly limited. A molded product obtained by molding said thermally expandable resin composition is excellent in fire resistance and is relatively low in elastic modulus, so that the use of refractory coating materials for pillars, beams and walls, etc., the use of fireproof sashes, the use of fireproof compartment passage structures and the use of fireproof doors which require high performance in fire resistance and elastic modulus are preferable. Strength of the expansion residue after heating is high, so that the use of fireproof sashes, the use of fireproof compartment passage structures and the use of fireproof doors are more preferable.

The invention claimed is:

1. A thermally expandable resin composition which contains an epoxy resin, a thermally expandable graphite and an inorganic filler, said inorganic filler excluding graphite, said thermally expandable resin composition being adapted for use in refractory coating materials for pillars, beams and walls, and fireproof sashes, and fireproof compartment passage structures and in fireproof doors, and said epoxy resin containing an epoxy compound containing a brominated epoxy compound represented by Formula (21)

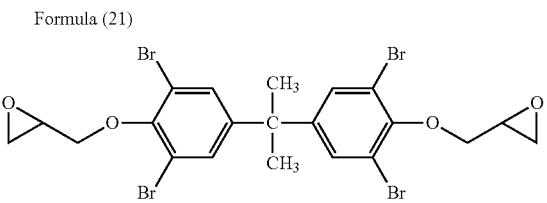

and a bisphenol-type epoxy compound represented by Formula (1), or an aliphatic epoxy compound selected from the group consisting of Formula (2), Formula (3-1), and combinations thereof:

Formula (1)

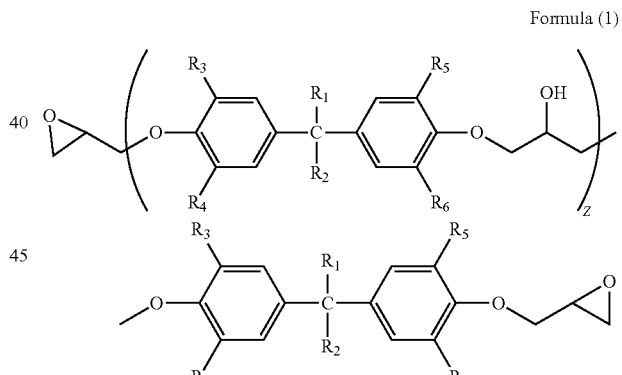

wherein $R_1$ and $R_2$ are each independently a hydrogen atom or a methyl group, $R_3$-$R_6$ are each independently any one of a hydrogen atom or a methyl group, Z is a repeating unit ranging from 1 to 100;

Formula (2)

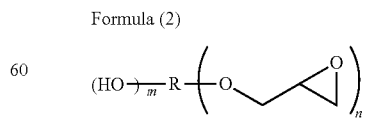

wherein R is an alkylene group having 1 to 500 carbon atoms, and can contain an oxygen atom, n is a repeating unit ranging from 2 to 4, m is a repeating unit ranging from 0 to 1 and n+m is the range of 2-4, and Formula (3-1)

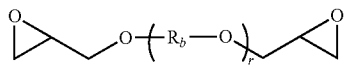

wherein $R_b$ is an alkylene group having 2 to 4 carbon atoms, r is a repeating unit ranging from 1 to 500, and the ratio of a brominated epoxy compound to at least one of a bisphenol-type epoxy compound and an aliphatic epoxy compound ranges from 99:1 to 1:99 in weight.

2. The thermally expandable resin composition as claimed in claim 1, in which said aliphatic epoxy compound is a bifunctional aliphatic epoxy compound represented by Formula (3)

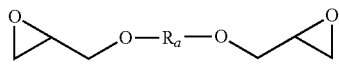

wherein $R_a$ is a radical having 1 to 500 carbon atoms, and can contain an oxygen atom.

3. The thermally expandable resin composition as claimed in claim 2, in which said aliphatic epoxy compound is represented by Formula (3-2):

Formula (3-2)

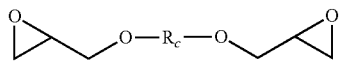

wherein $R_c$ is an alkylene group having 2 to 10 carbon atoms.

4. The thermally expandable resin composition as claimed in claim 1, in which said aliphatic epoxy compound is at least one selected from the group consisting of the Formula (4)-Formula (9)

Formula (4)

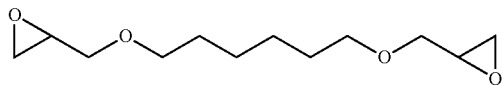

Formula (5)

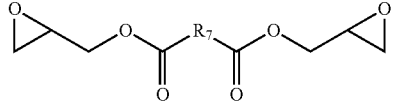

wherein $R_7$ is any one of an alkylene group having 1 to 20 carbon atoms, alkenylene group having 1 to 20 carbon atoms or arylene group having 1 to 20 carbon atoms;

Formula (6)

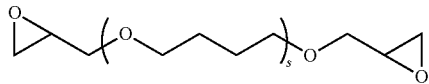

wherein s is a repeating unit ranging from 1 to 500;

Formula (7)

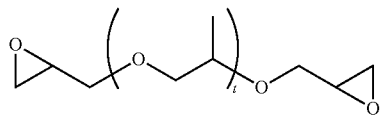

wherein t is a repeating unit ranging from 1 to 500;

Formula (8)

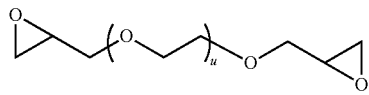

wherein u is a repeating unit ranging from 1 to 500;

Formula (9)

5. The thermally expandable resin composition as claimed in claim 1, in which said aliphatic epoxy compound contains Formula (2a)

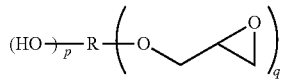

wherein R is an alkylene group having 1 to 500 carbon atoms, and can contain an oxygen atom, q is a repeating unit ranging from 3 to 4, p is a repeating unit ranging from 0 to 1 and p+q is the range of 3-4.

6. The thermally expandable resin composition as claimed in claim 5, in which said aliphatic epoxy compound is at least one selected from the group consisting of the Formula (10)-Formula (12)

Formula (10)

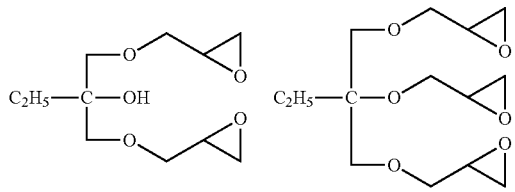

Formula (11)

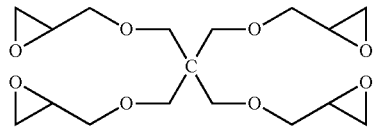

-continued

Formula (12)

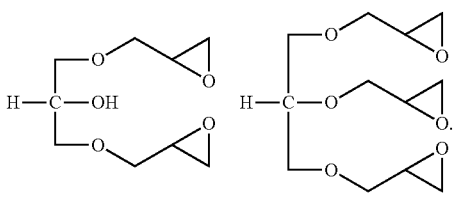

7. The thermally expandable resin composition as claimed in claim 4, in which said epoxy resin contains an amino compound-containing epoxy curing agent, and said amino compound-containing epoxy curing agent contains at least one selected from the group consisting of Formula (13)-Formula (16)

$$R_8\text{—}O\text{—}R_9\text{—}NH_2 \quad \text{Formula (13)}$$

wherein $R_8$ is an alkylene group having 1 to 20 carbon atoms, alkenyl group having 1 to 20 carbon atoms or aryl group having 1 to 20 carbon atoms, may contain an oxygen atom, $R_9$ is an alkylene group having 1 to 20 carbon atoms, alkenylene group having 1 to 20 carbon atoms or arylene group having 1 to 20 carbon atoms, may contain an oxygen atom Formula (14)

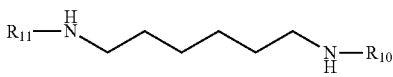

wherein $R_{10}$ and $R_{11}$ are each independently a hydrogen atom, an alkyl group having 1 to 20 carbon atoms, alkenyl group having 1 to 20 carbon atoms or aryl group having 1 to 20 carbon atoms Formula (15)

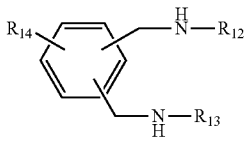

wherein $R_{12}$, $R_{13}$ and $R_{14}$ are each independently a hydrogen atom, an alkyl group having 1 to 20 carbon atoms, alkenyl group having 1 to 20 carbon atoms or aryl group having 1 to 20 carbon atoms, may contain an oxygen atom $$R_{15}\text{—}NH_2 \quad \text{Formula (16)}$$

wherein $R_{15}$ is each independently an alkyl group having 1 to 20 carbon atoms, alkenyl group having 1 to 20 carbon atoms or aryl group having 1 to 20 carbon atoms, may contain an oxygen atom.

8. The thermally expandable resin composition as claimed in claim 6, in which said epoxy resin contains an amino compound-containing epoxy curing agent, and said amino compound-containing epoxy curing agent contains at least one selected from the group consisting of Formula (13)-Formula (16)

$$R_8\text{—}O\text{—}R_9\text{—}NH_2 \quad \text{Formula (13)}$$

wherein $R_8$ is an alkylene group having 1 to 20 carbon atoms, alkenyl group having 1 to 20 carbon atoms or aryl group having 1 to 20 carbon atoms, may contain an oxygen atom, $R_9$ is an alkylene group having 1 to 20 carbon atoms, alkenylene group having 1 to 20 carbon atoms or arylene group having 1 to 20 carbon atoms, may contain an oxygen atom Formula (14)

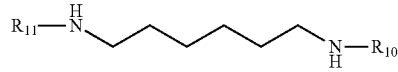

wherein $R_{10}$ and $R_{11}$ are each independently a hydrogen atom, an alkyl group having 1 to 20 carbon atoms, alkenyl group having 1 to 20 carbon atoms or aryl group having 1 to 20 carbon atoms Formula (15)

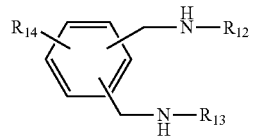

wherein $R_{12}$, $R_{13}$ and $R_{14}$ are each independently a hydrogen atom, an alkyl group having 1 to 20 carbon atoms, alkenyl group having 1 to 20 carbon atoms or aryl group having 1 to 20 carbon atoms, may contain an oxygen atom $$R_{15}\text{—}NH_2 \quad \text{Formula (16)}$$

wherein $R_{15}$ is each independently an alkyl group having 1 to 20 carbon atoms, alkenyl group having 1 to 20 carbon atoms or aryl group having 1 to 20 carbon atoms, may contain an oxygen atom.

9. The thermally expandable resin composition as claimed in claim 7, in which said inorganic filler is ammonium polyphosphate and calcium carbonate.

10. The thermally expandable resin composition as claimed in claim 8, in which said inorganic filler is ammonium polyphosphate and calcium carbonate.

* * * * *